United States Patent [19]

Schulte-Ladbeck

[11] Patent Number: 5,199,153

[45] Date of Patent: Apr. 6, 1993

[54] METHOD FOR MAKING A FLANGED PIPE LENGTH HAVING A LINING OF PLASTIC MATERIAL

[75] Inventor: Bernd Schulte-Ladbeck, Houston, Tex.

[73] Assignee: Compagnie Plastic Omnium, Lyons, France

[21] Appl. No.: 801,682

[22] Filed: Dec. 2, 1991

[30] Foreign Application Priority Data

Dec. 3, 1990 [FR] France .................. 90 15095

[51] Int. Cl.⁵ ............... B29C 57/04; B29C 63/34
[52] U.S. Cl. ......................... 29/447; 29/451;
29/469.5; 83/875; 264/249; 264/269; 264/322;
264/295; 264/331.14; 264/DIG. 66; 264/293;
425/392; 425/DIG. 55; 425/DIG. 218; 285/55
[58] Field of Search ............. 29/469.5, 512, 521,
29/447, 457; 83/875, 20; 425/DIG. 218, 392,
508, DIG. 55; 264/269, 229, 293, 249, 295, 322,
310, 331-314, DIG. 66; 285/55

[56] References Cited

U.S. PATENT DOCUMENTS

| | | | |
|---|---|---|---|
| 3,050,786 | 8/1962 | St. John et al. | 264/269 |
| 4,520,547 | 6/1985 | Laursen et al. | 29/469.5 |
| 4,643,457 | 2/1987 | Press | 285/55 |

Primary Examiner—Jeffery Thurlow
Assistant Examiner—Mathieu Vargot
Attorney, Agent, or Firm—Schweitzer Cornman & Gross

[57] ABSTRACT

A method of making a flanged pipe length includes flaring a metal pipe by rotating a grooved tool about the inside of the pipe and introducing a plastic tubular sleeve into the pipe. The tubular sleeve is subsequently heated and forced against the flanged portion of the metal pipe whereby the plastic material assumes a shape complementing the projections formed by the grooved tool.

4 Claims, 3 Drawing Sheets

METHOD FOR MAKING A FLANGED PIPE LENGTH HAVING A LINING OF PLASTIC MATERIAL

BACKGROUND OF THE INVENTION

The invention relates to a method for making a flanged length of pipe having a lining of plastic material. It is known, particularly in the chemical industry, to make piping formed of steel tubes having a lining of plastic material, particularly of fluorinated resin such as PTFE. These tubes have very good resistance to corrosion from chemical products in a wide range of temperatures. Depending on its nature, the lining does not adhere or adheres very weakly to the metal tube. The resistance to leakage of piping made of tubes of the known type is thus threatened, particularly at junctions between two tubes connected by end flanges. Any creep or shrinkage of the plastic lining material at the flanges can compromise the resistance of the joint to leakage.

SUMMARY OF THE INVENTION

It is the purpose of the present invention to enable pipe lengths formed from metal tubing with a plastic lining to be made with improved bonding to the tube, particularly at end flanges.

The invention has as its subject matter a method for making a flanged pipe length provided with a plastic lining, characterized by the fact that it has three steps consisting in:

holding the end of a metal tube in a clamping device;
causing a grooved tool to rotate about an axis of revolution and apply it to the inside surface of the end of the tube;
moving the tool around the inside surface of the tube and simultaneously making it rotate about an axis perpendicular to the axis of revolution of the tool until an end portion flaring toward the outside of the tube is obtained to form a flange and is provided with projections in the form of substantially circular ridges concentric with the axis of the tube;
introducing a tubular sleeve of plastic material into the tube with an end portion extending out past the flared end of the tube;
heating the said sleeve to a temperature close to the melting point of the plastic material;
applying the end of the sleeve against the flared end portion of the tube so that the plastic material assumes a shape complementing the projections formed in the said end portion of the tube.

The invention will be better understood from the following description and from the appended figures given as nonlimiting examples, wherein

DETAILED DESCRIPTION OF THE INVENTION

Figure 2A:
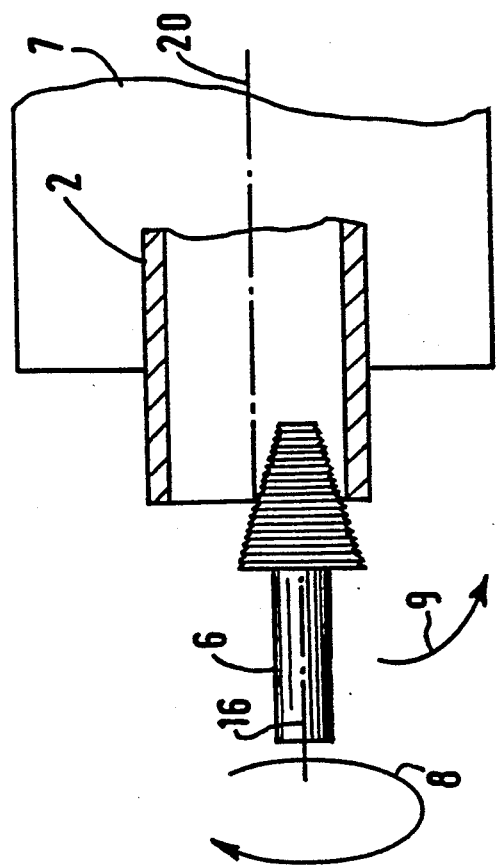
Figure 2B:
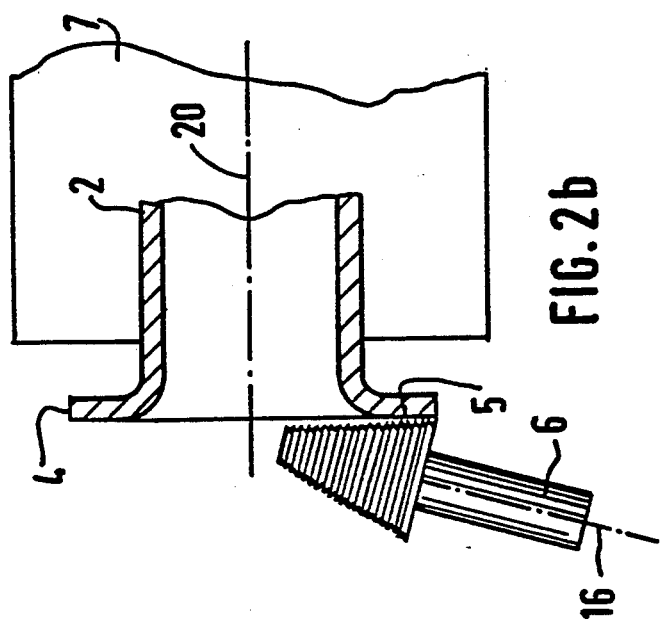
Figure 2C:
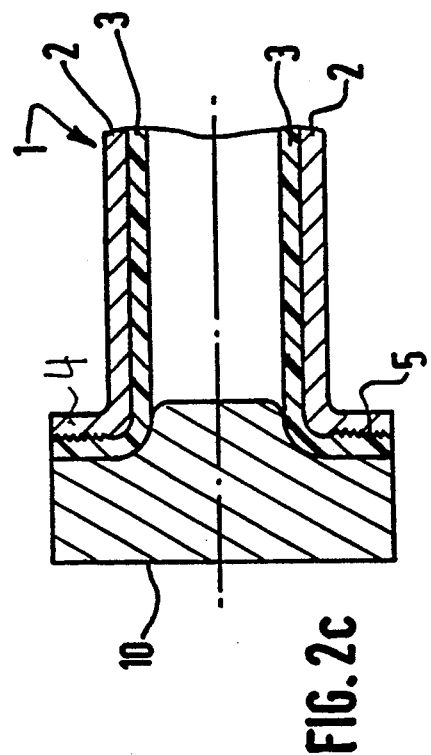
Figure 3:
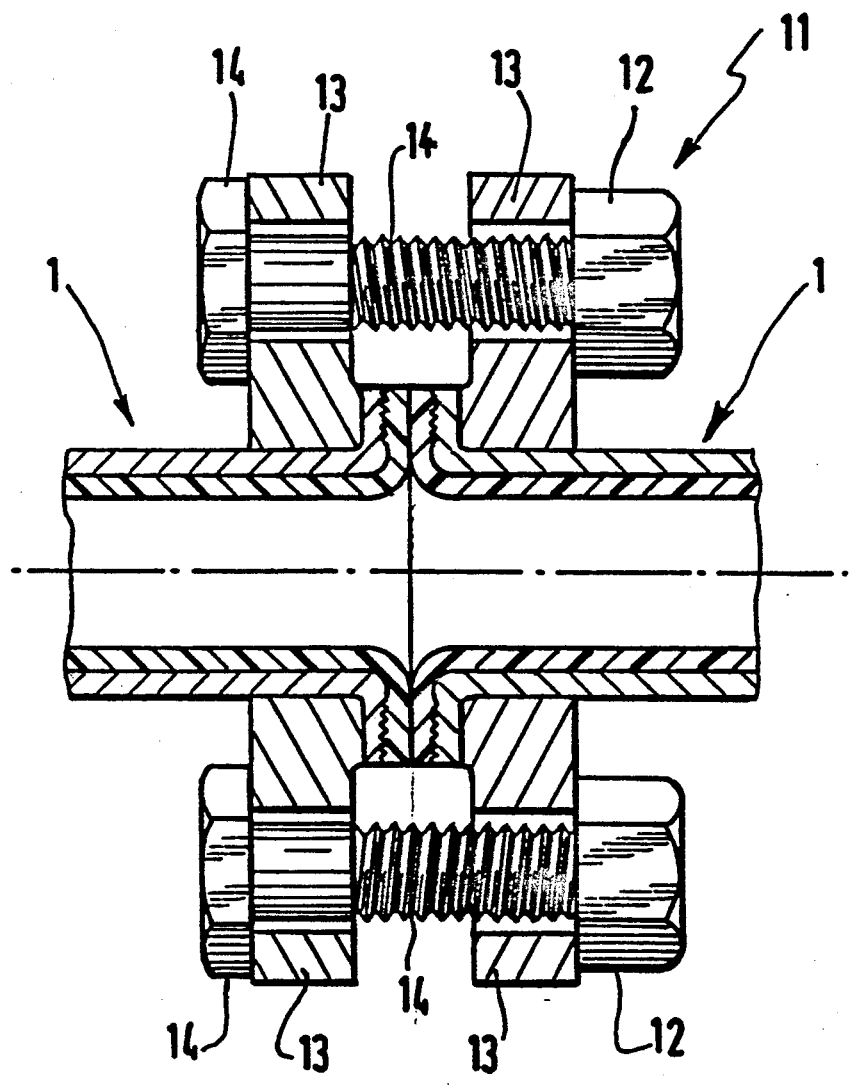
FIG. 3 is a fragmentary cross section of the joining of two pipe lengths obtained according to the present invention.

In FIGS. 1 to 3, the same references have been used to identify the same items.

Figure 1A:
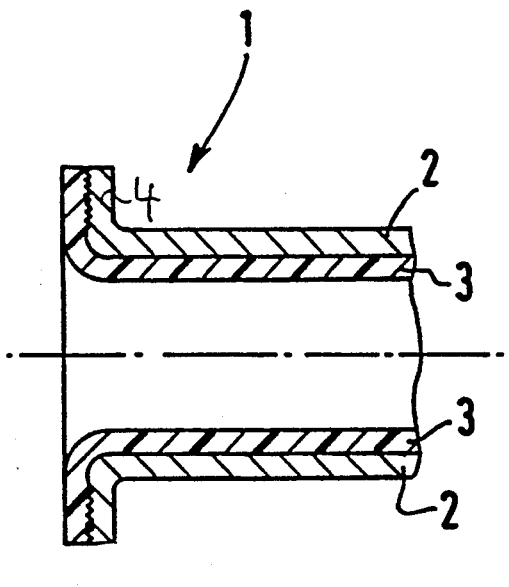
FIG. 1 includes three views 1a to 1c of the end of a flanged pipe length obtained according to the invention, FIG. 2 includes three diagrams 2a to 2c illustrating the method of the present invention.

In FIG. 1a can be seen the end of a pipe length 1 obtained according to the present invention, comprising a metal tube 2 provided with a lining 3 of plastic material, advantageously of fluorinated resin, particularly PTFE (polytetrafluoroethylene).

Figure 1B:
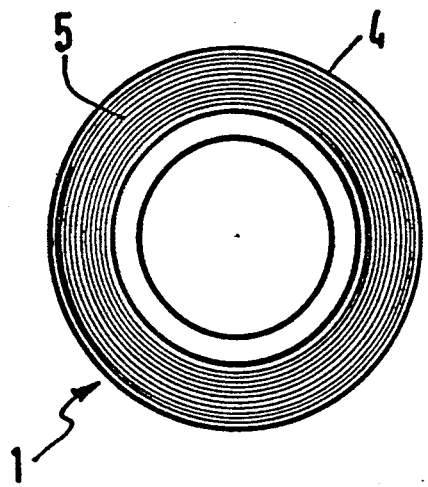

As it can be seen in FIG. 1b, to improve the bonding of the plastic lining material to the outwardly flared end portion forming the flange 4 of the tube 2, projections such as ribs, grooving or ridges 5 are provided on this flared end 4. In the example shown in the figure, the projections are defined by concentric grooves, the center corresponding substantially to the axis of the tube.

Figure 1C:
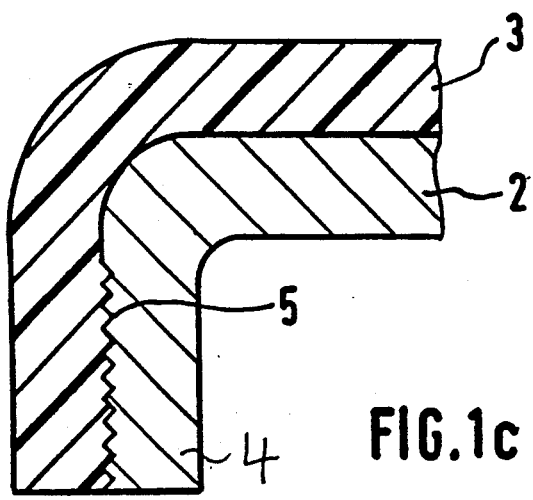

As it can best be seen in the partial enlargement in FIG. 1c, the projections 5 are impressed into the flared end portion of the lining 3, which improves the bonding of the plastic lining and thus particularly prevents it from creeping or shrinking.

In FIG. 2 is shown the practice of the method of the present invention. The end of a metal tube 2, a steel pipe for example, is held in place in a clamping device 7. A grooved tool 6 advantageously of a truncoconical shape bears against the inside face of the tube 2. Advantageously, as shown in FIG. 2a, the axis of rotation 16 of the tool 6 is parallel to the axis 20 of the tube 2. The tool 6 is rotated (symbolized by the arrow 8) and at the same time it is made to rotate about an axis perpendicular to the axis 16 (symbolized by the arrow 9). The tube 2 or the tool 6 is simultaneously made to rotate about the longitudinal axis 20 of the tube.

The rotation about the axis 16 permits the formation of projections in the form of ridges 5. The rotation about the axis 20 combined with the rotation about an axis perpendicular to axis 16 permits the end of the tube to be flared outwardly and form a flange 4, as illustrated in FIG. 2b.

The method of the present invention permits producing projections in the form of concentric ridges 5 about the axis 20 of the tube. These projections permit a particularly effective bonding of the plastic material forming the lining. Moreover, the simultaneous production of the flange 4 and projections 5 permits reducing the cost.

Then a tubular sheath of plastic material is introduced into the tube 2 and heated to a temperature close to its melting temperature; then the end of the sheath beyond the flared end of the tube is applied to the latter with a flaring tool 10 illustrated in FIG. 2c.

Tool 10 is applied with sufficient force so that the plastic material assumes a shape complementary to the ridges 5. The formation of complementary ridges in the plastic lining and their bonding in the ridges 5 of the tube prevent the lining from creeping when a force is applied to it and from shrinking when it cools.

In FIG. 3 can be seen a joint 11 according to the present invention between two pipe lengths assembled in a leak-proof manner. In the example shown in FIG. 3 a collar 13 is placed around each pipe length 1. The two collars are put together and tightened by bolt and nut assemblies 14 and 12. The tightening contributes to the deformation of the plastic material of the flared end portion of the lining so that, if the plastic material has not previously assumed a shape perfectly complementary to that of the ridges 5 when the tool 10 was applied, it assumes it by resilient deformation when the collars are tightened.

The joint 11 of FIG. 3 offers a reliability superior to that of joints of known type.

The invention is applied to the production of pipelines, particularly for the chemical industry.

I claim:

1. A method for making a flanged length of pipe provided with a lining of plastic material, comprising the steps of:
    (a) supplying a length of metal tubing (2) having a longitudinal axis (20);
    (b) clamping one end of the metal tubing in a clamping device (7) and rotating said tubing about said longitudinal axis (20);
    (c) rotating a grooved tool (6) about an axis of revolution (16) and applying it to the inside face of the other end of the metal tubing;
    (d) forming a grooved flange on said tubing by moving the tool (6) on the inside surface of the tubing (2) and simultaneously pivoting the tool about an axis perpendicular to the axis of revolution to generate an annular flange having projections (5) in the form of substantially circular ridges concentric with the axis (20) of the tubing;
    (e) introducing a cylindrical tubular sleeve (3) of plastic material into the metal tubing (2) and projecting an end portion outwardly beyond the flanged end of the tubing;
    (f) heating said sleeve to a temperature sufficient to make the plastic material deformable;
    (g) reforming the projecting end of the plastic sleeve (3) and forcing it intimately against the flange (4) of the metal tubing in a manner whereby said plastic material assumes a shape complementing the projections (5) formed on the flange (4) and said plastic sleeve forms a tight bond to said flange (4).

2. A method according to claim 1, wherein the plastic material (3) is a fluorinated resin.

3. A method according to claim 2, wherein the plastic material (3) is PTFE.

4. A method for making a flanged length of pipe provided with a lining of plastic material, comprising the steps of:
    (a) supplying a length of metal tubing (2) having a longitudinal axis (20);
    (b) clamping one end of the metal tubing in a clamping device (7) and rotating said tubing about said axis (20);
    (c) rotating a grooved tool (6) of truncoconical shape about an axis of revolution (16) and applying it to the inside face of the end of the metal tubing;
    (d) forming a grooved flange on said tubing by moving the tool (6) on the inside surface of the tubing (2) and simultaneously pivoting the tool about an axis perpendicular to the axis of revolution to generate a flange having projections (5) in the form of substantially circular ridges concentric with the axis (20) of the tubing;
    (e) introducing a cylindrical tubular sleeve (3) of plastic material into the metal tubing (2) and projecting an end portion outwardly beyond the flared end of the tubing;
    (f) heating said sleeve to the deformation point of the plastic material;
    (g) reforming the projecting end of the sleeve (3) and forcing it intimately against the flange (4) of the metal tubing in a manner whereby said plastic material assumes a shape complementing the projections (5) formed on the flange (4) and said sleeve forms a tight bond to said flange (4).

* * * * *